(No Model.) 2 Sheets—Sheet 1.
W. PATTERSON.
CAR FENDER.
No. 583,931. Patented June 8, 1897.
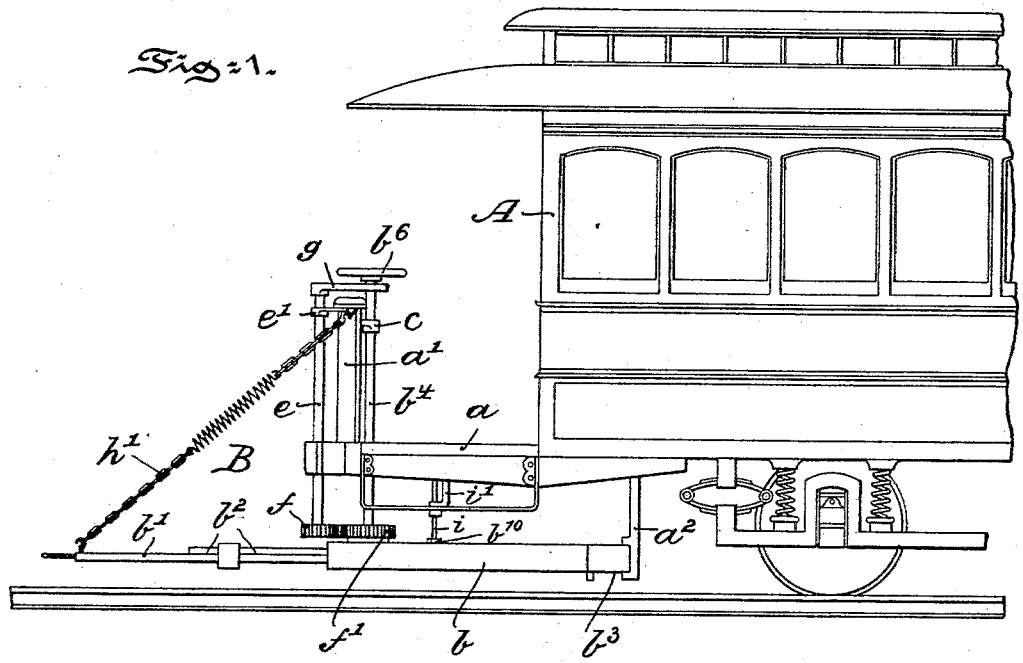
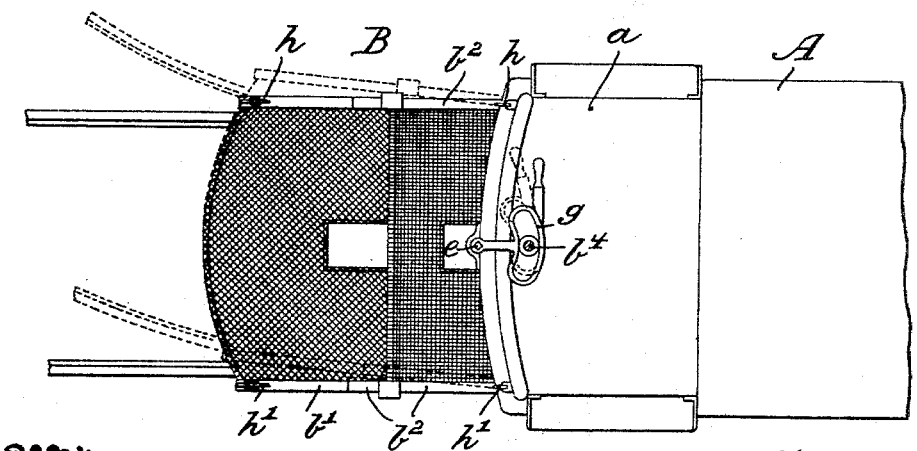
Witnesses:
Thomas M. Smith.
Richard C. Maxwell.
Inventor:
William Patterson,
By J. Walter Douglass.
Attorney.

(No Model.)
W. PATTERSON.
CAR FENDER.
No. 583,931.
2 Sheets—Sheet 2.
Patented June 8, 1897.
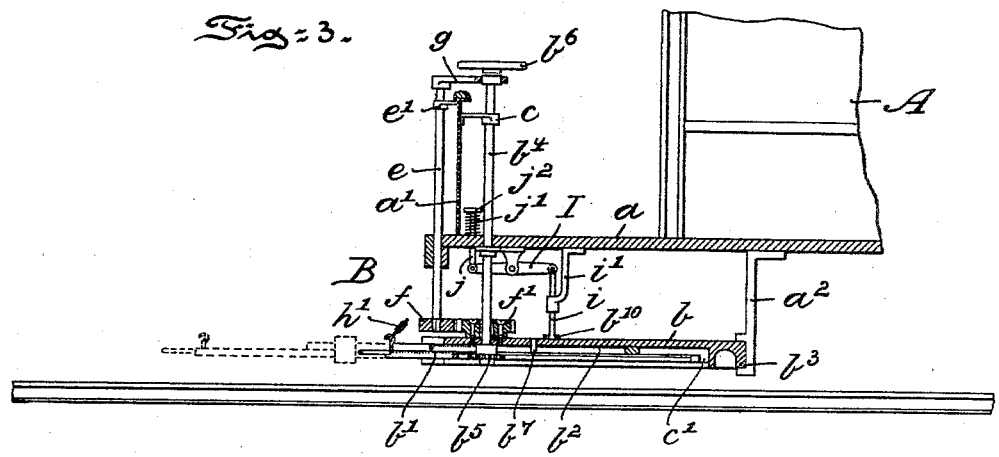
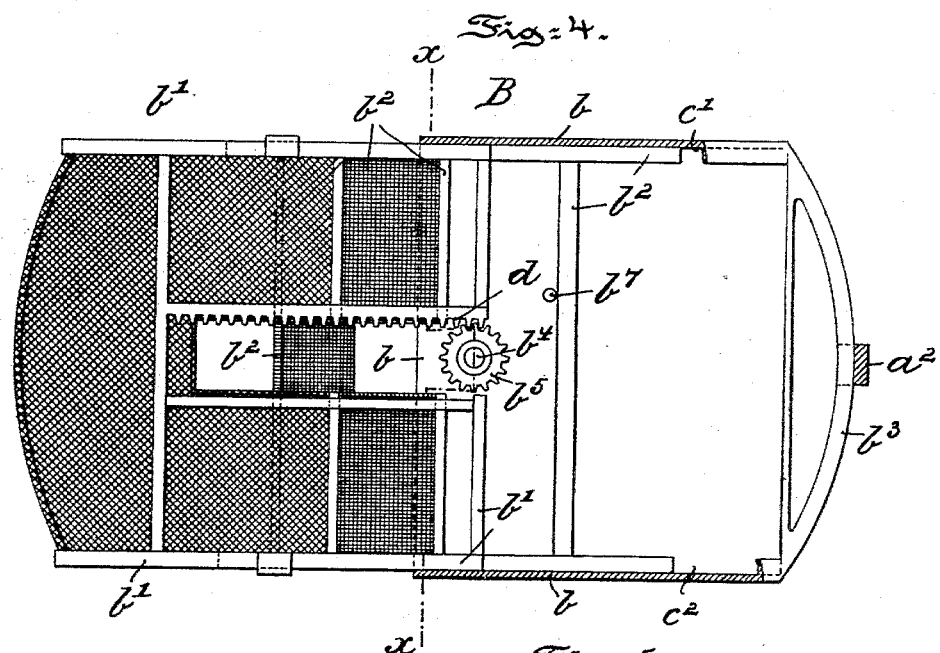
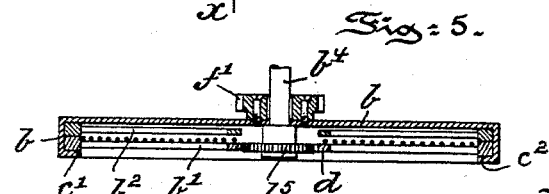
Witnesses:
Thomas M. Smith.
Richard C. Maxwell
Inventor:
William Patterson,
By J. Walter Douglass
Attorney.

UNITED STATES PATENT OFFICE.

WILLIAM PATTERSON, OF PHILADELPHIA, PENNSYLVANIA.

CAR-FENDER.

SPECIFICATION forming part of Letters Patent No. 583,931, dated June 8, 1897.

Application filed March 8, 1897. Serial No. 626,524. (No model.)

*To all whom it may concern:*

Be it known that I, WILLIAM PATTERSON, a subject of the Queen of Great Britain, residing at the city of Philadelphia, in the county of Philadelphia and State of Pennsylvania, have invented certain new and useful Improvements in Car-Fenders, of which the following is a specification.

My invention has relation to a fender for trolley and other motor cars for preventing, in application, loss of life or limb and to act as a buffer to obstructions in the path of the same, in normally operative position, and to automatically by telescoping close or shut in out of the way beneath the car, and in such connection it relates particularly to the construction and arrangement of the fender for such operations.

The principal objects of my invention are, first, to provide a car-fender which in application is a protection to life and limb and is adapted also to automatically close up or in by the weight of an obstruction in the path or abutting against the same, yet not, however, to close up or in by the weight of a person, but to catch and support the object against injury; second, to provide a telescoping car-fender adapted to be shifted manually, so as to travel parallel with the road-bed or car and also to be brought into an operative position, but of being closed or shut automatically or manually; third, to provide a telescoping fender for motor and other cars adapted to be oscillated by a lever and to be extended into an operative position by a rotary action and of being readily attached to and detached from the car and the members of the fender readily taken apart for repairs or other purposes, and, fourth, to provide a fender which is adapted from the platform of the car, when necessary or desirable, to be shut in under the car out of the way and also from the platform of the car of being extended into a normally operative position and of being oscillated when extended so as to conform in the travel of the car to the curvature of the road-bed and thereby to travel parallel or substantially so with the tracks thereof.

My invention, stated in general terms, consists of a car-fender constructed and arranged in substantially the manner hereinafter described and claimed.

The nature and scope of my invention will be more fully understood from the following description, taken in connection with the accompanying drawings, forming part hereof, in which—

Figure 1 is a side elevational view of a portion of a car, showing a fender embodying features of my invention in application thereto. Fig. 2 is a view partly in top or plan and partly in section of the fender. Fig. 3 is a longitudinal central sectional view of the telescoping fender in a closed or shut-in position. Fig. 4 is an enlarged plan view of the under side of the telescoping fender in an extended operative position, and Fig. 5 is a transverse sectional view of parts of the fender on the line $x\,x$ of Fig. 4.

Referring to the drawings, A is a car of any suitable construction provided with a platform $a$, having a dashboard $a'$. Beneath the platform of the car, on the under side, is applied a recessed seat, guide, or rest $a^2$ for a purpose to be presently explained.

B is the telescoping fender, comprising the members $b$, $b'$, and $b^2$. The member $b$ consists, preferably, of an oblong box-shaped channeled frame or housing provided with a rear curved crosstree or bearer $b^3$, adapted to slide in engagement with the recessed seat, guide or rest $a^2$ on the under side of the car A.

$b^4$ is a vertical or main shaft extending through the body of said frame and a bearing $c$, applied to the inner side of the dashboard $a'$. The lower end of the shaft $b^4$ is provided with a pinion $b^5$ and the upper end with a rotatable hand-wheel $b^6$ or other suitable device.

$b'$ and $b^2$ are the other members of the fender, consisting of telescoping leaves slidable in guides or ways $c'$ and $c^2$ on the respective sides of the fender-casing $b$. Each of the telescoping leaves of the fender is covered with a yielding or pliable material, and the framework of the leaves may be of any preferred form and padded or otherwise arranged so that the impact of a person against either of them in extended positions from the oblong frame or housing $b$ will not be maimed or bruised thereby. Each of the leaves $b'$ and $b^2$ of the fender B is slitted longitudinally, and alongside of the slit of the leaf $b'$ is provided a rack $d$ for engaging with the pinion $b^5$.

$b^7$ is a back-stop or pin to limit the forward range of movement of the other leaf $b^2$ of the telescoping fender B.

$e$ is a shaft held in a bearing $e'$, suitably applied to the outer side of the dashboard $a'$ and carrying a pinion $f$, adapted to mesh with a complemental pinion $f'$, secured to the housing $b$ of the fender, as clearly illustrated in Figs. 3 and 5. The upper end of the shaft $e$ is provided with a hand operating-lever $g$, the loop of which lever embraces the shaft $b^4$, as fully illustrated in Fig. 3.

$h$ and $h'$ are chains or cords, provided with coiled springs adapted to be attached to and detached from the dashboard $a'$ of the car and to and from the forward extremital portion of the leaf $b'$ of the fender for maintaining the same in extended operative position the required distance above the road-bed and at the same time in the impact of an object against the fender to catch the person, to prevent undue bearing down of the fender to cause the same to contact with the ground and thereby possibly to disarrange the members of the fender to such an extent as to render the same unfit for subsequent use unless repairs be made thereto, and, moreover, the springs of the said chains so applied as described permit of the leaves of the fender being readily turned with the shifting manually of the fender from the platform of the car.

The casing $b$ and the leaves $b'$ and $b^2$, sliding therein, are supported from the under side of the car-platform by means of the rest $a^2$ and the shaft $b^4$.

When the fender has assumed an extended position for use by the operation of the lever $g$, it will be locked in that position by means of a bolt $i$, in sliding engagement with a bearing $i'$, secured to the under side of the platform $a$ of the car A. This bolt $i$ is pivoted to a movable cross-beam I, and the opposite end of this beam is pivoted to a vertical rod $j$, having a spring $j'$, coiled around the same and provided with a button or cap $j^2$ for engaging the foot therewith, so as to depress the rod $j$ under the tension of the spring $j'$, and thereby to release the bolt $i$ from its engagement with an opening $b^{10}$ in the frame or housing $b$, as clearly illustrated in Fig. 3 of the drawings, so that then the free oscillation of the fender to the right or left may be attained.

The mode of operation of the fender hereinbefore described is as follows: The fender being in a shut-in or closed position the wheel $b^6$ when turned will, through the pinion $b^5$, extend the leaves $b'$ and $b^2$ of the fender into an operative position, or by a reverse movement said leaves may be caused to telescope, so as to be shifted into the frame or housing $b$ beneath the platform of the car, out of the way. The leaves $b'$ and $b^2$ are held frictionally together during a portion of their forward movement and until the stop-pin $b^7$ contacts with the leaf $b^2$, when the pinion $b^5$, through the rack $d$ of the leaf $b'$, will further extend the leaf $b'$, while the leaf $b^2$ remains stationary. By a heavy object brought against the leaf $b'$ of the fender in its extended position the respective leaves of the fender may be shifted automatically into the housing $b$, but it is, however, to be understood that the impact of an object, such as a person, against the extended leaves of the fender will not cause them to be shifted into the housing $b$, as provision is made to avoid such an accidental closing or shifting of said leaves of the fender. By operating the hand-lever $g$ the pinion $f$ of the shaft $e$ will turn the pinion $f'$, which, being secured directly to the casing $b$, causes the fender to oscillate, so as to conform to any curvature of the road-bed in order that the fender may assume a position substantially parallel with the tracks thereof in taking to the curve in the bed. The pinion $f'$ is not connected with the shaft $b^4$, but said shaft passes loosely through said pinion, as illustrated in Fig. 5. This is an advantage in that the fender does not protrude obliquely to the position or plane of the car. Hence it matters not what the position of the car may be or the curvature of the road in which the car may be traveling, thereby preventing the fender from engaging or extending into or against any projection or obstruction slightly beyond the path of the road-bed, whether curved or straight.

It will be manifestly obvious to those skilled in the art to which my invention appertains that modifications may be made as to details of the construction of the fender, and hence I do not wish to be understood as limiting myself to the precise construction and arrangement of the fender as hereinbefore described and as illustrated in the drawings; but,

Having thus described the nature and objects of my invention, what I claim as new, and desire to secure by Letters Patent, is—

1. A car-fender provided with a frame or housing, two leaves adapted to telescope therein, one of said leaves being provided with a rack, a shaft extending into the frame or housing, a pinion secured to said shaft and engaging said rack, said pinion and rack adapted to advance or retract both leaves in said housing, and means for arresting the movement of one of said leaves while the other is moving, substantially as and for the purposes described.

2. A car-fender provided with a housing pivotally supported beneath the platform of a car and held in sliding engagement with a recessed seat, guide or rest, said fender provided with telescoping leaves, whereof one is provided with a rack, a shaft provided with an operating device and a pinion adapted to engage said rack, substantially as and for the purposes described.

3. A car-fender provided with a frame or housing pivotally supported below the platform of a car, a series of leaves adapted to be telescoped in said frame or housing, a shaft carried by the car, a pinion carried by said shaft, a pinion secured to said frame or housing at its pivotal point of support and meshing with the pinion of said shaft, and a lever connected with said shaft and adapted to oscillate said telescoping leaves in their extended position, substantially as and for the purposes described.

4. A car-fender provided with telescoping leaves adapted to be shifted into a housing movably supported beneath the platform of a car and adapted to be manually operated so as to extend the same and a device actuated by a pinion for oscillating in the extended position of the fender, the telescoping leaves thereof, substantially as and for the purposes described.

5. A car-fender, comprising a series of telescoping leaves, means for extending said leaves, a shaft, and means connected therewith for permitting of the oscillation of the leaves of said fender in extended position, and said leaves adapted to be returned to a telescoped or nested position, substantially as and for the purposes described.

6. A car-fender, comprising a frame or housing having a series of telescoping leaves working in guides or ways, one of which leaves is provided with a rack, a shaft provided with a pinion, an operating device, a lever and pinion engaging a gear of said frame for oscillating said fender and means for locking said fender in certain position against oscillations thereof, substantially as and for the purposes described.

7. A car-fender provided with telescoping leaves operated by a lever through a rack and pinion, means for oscillating said fender and a spring-controlled locking device for preventing oscillations of said fender, substantially as and for the purposes described.

In testimony whereof I have hereunto set my signature in the presence of two subscribing witnesses.

WILLIAM PATTERSON.

Witnesses:
J. WALTER DOUGLASS,
RICHARD C. MAXWELL.